US010488275B2

(12) United States Patent
Benevides et al.

(10) Patent No.: US 10,488,275 B2
(45) Date of Patent: Nov. 26, 2019

(54) DEVICE FOR NONINVASIVELY VERIFYING THERMOLUMINESCENT DOSIMETER CARD HEATER TIME TEMPERATURE PROFILE

(71) Applicant: The United States of America as Represented by the Secretary of the Navy, Silver Spring, MD (US)

(72) Inventors: Luis Benevides, Gaithersburg, MD (US); Jeffrey Delzer, Chesapeake, VA (US)

(73) Assignee: The United States of America as Represented by the Secretary of the Navy, Arlington, VA (US)

(*) Notice: Subject to any disclaimer, the term of this patent is extended or adjusted under 35 U.S.C. 154(b) by 100 days.

(21) Appl. No.: 15/381,690

(22) Filed: Dec. 16, 2016

(65) Prior Publication Data
US 2017/0284871 A1    Oct. 5, 2017

Related U.S. Application Data

(60) Provisional application No. 62/267,969, filed on Dec. 16, 2015.

(51) Int. Cl.
*G01K 13/00* (2006.01)
*G01T 1/11* (2006.01)

(52) U.S. Cl.
CPC ............... *G01K 13/00* (2013.01); *G01T 1/11* (2013.01)

(58) Field of Classification Search
CPC .................... G01T 1/11; G01T 1/113
See application file for complete search history.

(56) References Cited

U.S. PATENT DOCUMENTS

| | | | | |
|---|---|---|---|---|
| 3,603,791 A * | 9/1971 | Chenault | ........... | G01T 1/115 250/337 |
| 3,638,017 A * | 1/1972 | Jones | ........... | G01T 1/115 235/491 |
| 3,790,784 A * | 2/1974 | Webb | ........... | G01T 1/115 250/337 |
| 2006/0043314 A1 * | 3/2006 | Katzir | ........... | G01T 1/11 250/484.5 |

* cited by examiner

*Primary Examiner* — Michael C Bryant
(74) *Attorney, Agent, or Firm* — Albert M. Churilla; Ning Yang; Diane Tso

(57) ABSTRACT

A non-invasive temperature verification system used in a TLD system, which comprises at least one thermal sensor, which is placed near each of TLD element, measuring its temperature during heating cycle. The signal data from each thermal sensor is converted to time temperature profile which is used to verify and calibrate the TLD system.

8 Claims, 8 Drawing Sheets

Regressions of Environmental Chamber Temperatures to thermocouple voltage readings. Regression $f(mV) = a + b \times (Temp, °C)$

DEVICE FOR NONINVASIVELY VERIFYING THERMOLUMINESCENT DOSIMETER CARD HEATER TIME TEMPERATURE PROFILE

CROSS-REFERENCE TO RELATED APPLICATIONS

This application claims priority to the U.S. provisional application No. 62/267,969, filed on Dec. 16, 2015.

FIELD OF INVENTION

This invention relates generally to thermoluminescence dosimetry card readers. More specifically this invention relates to a device, and method for noninvasively verifying the time temperature profile of a thermoluminescence dosimetry card reader.

BACKGROUND OF THE INVENTION

A thermoluminescent dosimeter (TLD) is a type of radiation dosimeter. When a TLD is exposed to ionizing radiation at ambient temperatures, the radiation interacts with the phosphor crystal within the TLD, and deposits all or part of the incident energy in that crystal. Some of the atoms in the crystal that absorb that energy become ionized, producing free electrons, and these free electrons are trapped by imperfections in the crystal lattice structure. Heating the phosphor crystal causes the crystal lattice to vibrate, and releases the trapped electrons in the process. The released electrons return to the original ground state, and the captured energy from ionization is emitted as light, hence the name thermoluminescent. The emitted light is counted by photomultiplier tubes within a TLD card reader, and the number of photons counted is proportional to the quantity of radiation striking the phosphor crystal. The two most common types of TLD phosphor are calcium fluoride and lithium fluoride. The calcium fluoride TLD is used to record gamma exposure. The lithium fluoride TLD can be used to detect gamma exposure or neutron exposure indirectly [1].

When a thermoluminescent element is heated from some low temperature to some high temperature (e.g. above 400° C.), the intensity of the luminescence increases at first with more electrons in the traps are released, and then decreases when the number of trapped electrons decreases. This gives rise to a peak in the luminescence, which appears at a certain temperature. If there are several types of traps, several peaks are observed at different temperatures. This graph of the luminescence intensity as a function of temperature is called a "glow curve". The heights of the peaks or the integrated area under the glow curve are found to depend on the radiation exposure dose. In a simple case, the dependence may be linear, which allows the radiation dose to be obtained from a measurement of the glow curve, after a proper calibration. This is the principle of thermoluminescence dosimetry (TLD) [1].

The electrons can also drop back to ground state after a long period of time. This effect is called fading, and is dependent on the incident radiation energy, and intrinsic properties of the TLD material. As a result, each crystal material possesses a limited shelf life after which dosimetry information can no longer be obtained. The shelf life of TLD material varies from several weeks in calcium fluoride to up to two years.

Temperature profile is a key process to evaluate TLD material for its dosimetry properties. Reliable results are obtained only when each TLD element is heated in a controlled and reproducible fashion (i.e. using the same initial and final temperatures and the same temperature variations during heating.) The most desirable way is to heat the elements linearly, so that for each element, the temperature follows the formula $T_{e1}=T_0+\alpha t$, where $T_0$ is the initial temperature, $T_{e1}$ is the temperature of the sample at time t, and $\alpha$ is the heating rate. It is advantageous to heat the sample as fast as possible, since in this case the glow peaks are sharp and easy to measure, and more samples can be measured in a given time period. Thus, it is important to assure that heating of the TLD elements accurately reflects the expected heating rates.

Several methods have been used in the past for heating the crystal (TLD element), which can be separated into three large categories, including contact heating, optical heating, and hot gas heating. Exemplary methods and systems may be found in a number of prior art publications, for example in U.S. Pat. Nos. 3,531,641, 3,729,630, 3,975,637, 4,204,119, 4,638,163, 4,835,388, 4,839,518, 5,041,734, 5,081,363, 5,606,163, 6,005,231 and 6,414,324.

Traditional contact heating uses tiny heaters placed in close contact with the crystal (TLD element), with the heater temperature controlled. Contact heating is highly non-uniform and relatively slow. The results are often non-reproducible, because the temperature of the TLD element depends on the thermal contact between the crystal element and the heater, repeat heating also limits a dosimeter's useful life. The contact pressure must be periodically checked, and adjusted to ensure proper thermal contact in order to eliminate incomplete readouts. In an optical heating method, the crystal element is heated via absorption of radiation emitted from an incandescent or laser source by either the crystal element or the substrate on which the crystal element is placed. Readout cycle using optical heating is fast, but the reproducibility of optical heating method is poor, especially with substrate heating. In addition, optical heating method requires the TLD chip (i.e. chip containing the TLD elements) to be thin and small, which results in reduced sensitivity for the dosimeter. In gas heating method, the crystal (TLD element) is heated by a stream of hot gas with controlled temperature. This method provides more uniform and faster heating, but requires a complex gas heating system, which is more expensive.

In all three heating methods, the temperature of the heating source is controlled but the real time temperature of the TLD element or the environmental chamber temperature is not measured to ensure accurate TLD heating. Currently, the verification of heating of a TLD element is done periodically or upon request, by the manufacturer during the TLD calibration process. The calibration process requires the TLD card reader to be opened up, and the temperature data directly obtained from the heater electronic board signal |ports|[YNCN1]. Because the temperatures measurements of the heater are taken while the device cover is open, the readings of these temperature measurements do not accurately reflect the true temperature profile of the TLD in operation. It also requires considerable downtime of the machine.

U.S. Pat. No. 7,439,524, to Abraham Katzir, describes an optical heating thermoluminescence-based dosimetry system, which is equipped with an infrared radiation (IR) radiometry subsystem for real-time control of heating of the TLD element. The IR radiometry subsystem monitors IR radiation emitted from each TLD element surface during the heating cycle. The respective IR radiation inputs are then converted to temperature of each TLD element, which are then used to control the laser that is heating the TLD element. While the Katzir device is capable of measuring the real-time temperature of each TLD elements during the heating cycle, the IR radiometry subsystem requires complex and delicately arranged optical pathway, using mirrors and lens or special optical fibers to collect and focus the IR radiation emitted from the surface of each TLD element to respective IR detector. The infrared detectors used for this IR radiometry subsystem also require a clean operating environment without dust and high humidity, which may limits its application in machines that utilize other heating methods. Accurate IR detectors are expensive. The hardware requirements of the IR radiometry subsystem may thus significantly increase the size and cost of the TLD card reader, strict its placement, transport and operation environment, and affects its reliability.

In conclusion, all prior art methods are disadvantageous in that the temperature of the TLD elements is not well monitored consequently, glow curves suffer from irreproducibility and so do dosimetry results. Therefore, it would be highly advantageous to have a TLD temperature monitoring system and method in which the temperature and heating rate of each TLD element is easily measured, and calibrated in real-time, which is also cost-effective, operational and reliable.

The primary advantage of the inventive device and method is that it allows for daily verification of the reader's temperature profile without any machine downtime or significant machine modification or additional hardware. It also allows inter comparison between readers to ensure that the same TLD card is appropriately read on separate readers.

SUMMARY OF INVENTIONS

Figure 1:
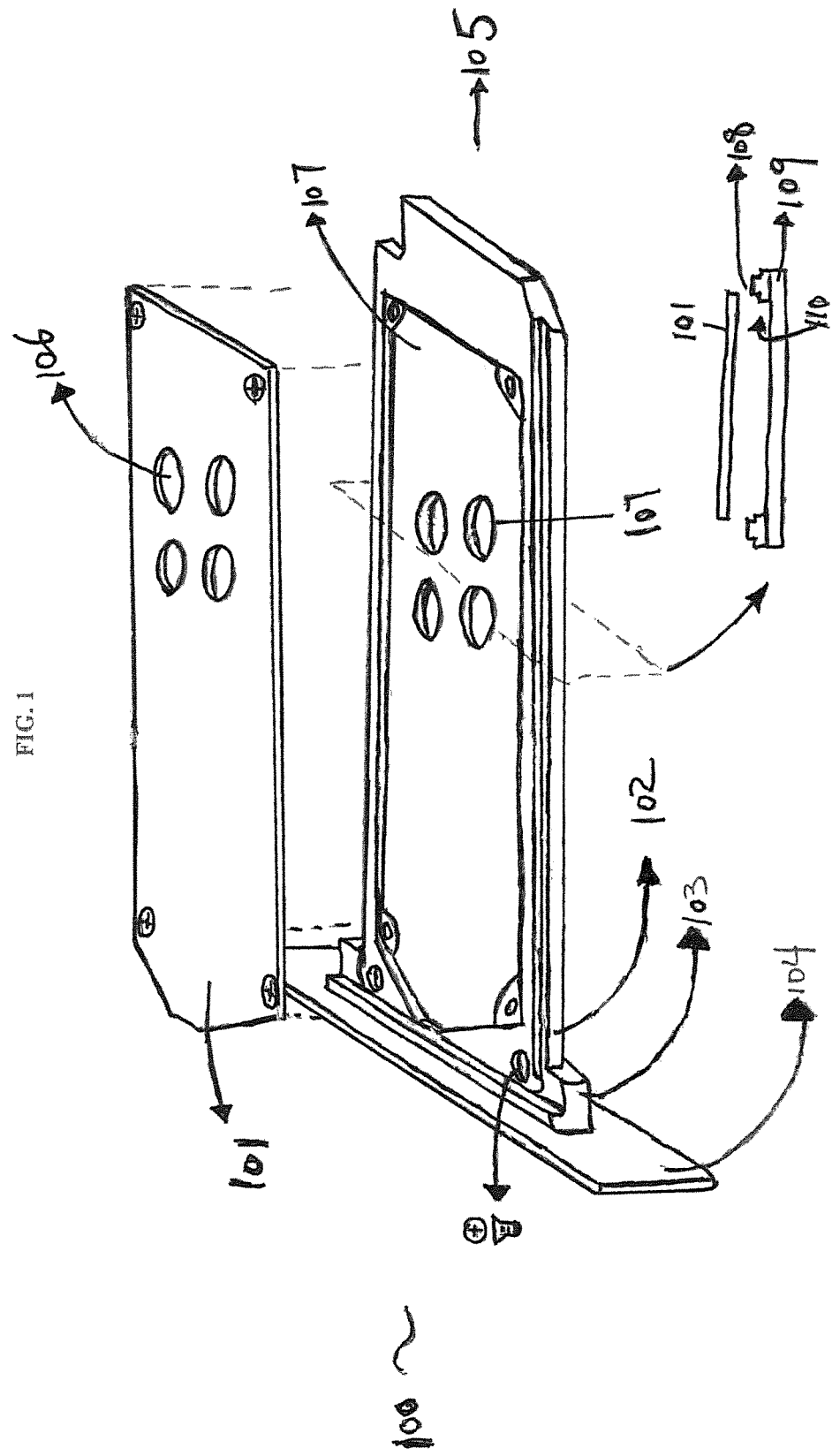
FIG. 1 shows a schematic diagram of a temperature sensor holder for the prototype of the noninvasive temperature verification subsystem of the present invention.

A main objective is a TLD system for dosimetry, which can be used for personal monitoring, for environmental monitoring, and for radiation therapy, which comprises an independent TLD temperature verification subsystem.

Another objective is an noninvasive temperature verification subsystem for TLD card readers.

Yet another objective is to provide noninvasive real-time verification of time temperature profiles of TLD elements during heating cycle. A system of the present invention includes at least one TLD element that stores energy when exposed to ionizing radiation, and releases the energy in the form of luminescent light when heated. The system also includes at least one heating source whose energy is used to heat the TLD element. The system further includes at least one thermal sensor (preferably thermal sensor that does not require additional optical hardware), each of which is placed near a TLD element, measuring its temperature, and generates a signal which may be measured and recorded by a computer or meter. The TLD system also comprises a computer program or similar analyzing programs that convert the signals from the thermal sensor into real-time temperature measurements of the TLD element. The computer program can plot the temperature as a function of time and thus producing a time temperature profile of the TLD element. The rapid response of the system makes it possible to control the heating rate of the element and to generate a desired heating scheme, such as linear heating or exponential heating.

Yet another objective of the present invention is a method to verify the time temperature profile and calibrate the heating rate of each TLD card reader.

DETAILED DESCRIPTION OF THE INVENTION

The examples in this disclosure are used only for the clarity of the description and are not limited to the illustrative embodiments. Additional data, operations, actions, tasks, activities, and manipulations will be conceivable from this disclosure and the same are contemplated within the scope of the illustrative embodiments.

A thermoluminescence-based dosimetry system of this invention comprises at least one thermoluminescent dosimetry (TLD) element operative to be heated controllably and to emit luminescence during the heating, the emitted luminescence correlated with a radiation dose to which the TLD element has been exposed; and a noninvasive temperature verification subsystem for real-time monitoring the temperature of the environmental chamber near the TLD elements.

The TLD system of the present invention further comprises a heating subsystem for providing a controllable heating rate of each TLD element; a thermoluminescence (TL) measuring subsystem for measuring the emitted luminescence, and for providing luminescence data; and a control subsystem for controlling heating parameters of the heating subsystem based on the heating rate and for providing at least one glow curve based on the luminescence data, the glow curve indicative of the radiation dose.

The thermoluminescence (TL) measuring subsystem includes a photodetector for measuring the luminescence emitted from the TLD element during the heating of the element. The signal generated by the photodetector is measured by the computer, and a plot of the emitted intensity as a function of the temperature (i.e. a glow curve) is obtained. The computer program analyses the glow curve, and determines the total radiation dose to which the element had been exposed.

The noninvasive temperature verification subsystem includes at least one temperature detector. The temperature detector further comprises at least one temperature sensor, a thermal sensor reader and a data logger. Each temperature sensor is placed within close proximity of a TLD element, to ensure accurate measurement of the real-time temperatures of the TLD element. The temperature sensor must be capable of accurate measurement within the temperature range of a TLD card reader, which may reach a high temperature of 400-450° C. Applicable sensors include but not limited to a thermocouple, a resistance thermometer or a thermistor. The thermal sensor provides signal data, such as in voltage, or electrical resistance, which correlate with the real-time temperature measurements of the sensor target. At least one thermal sensor reader is operatively connected to the thermal sensors, which receives the signal data from each temperature sensor, and converts the signal data into temperature data for the corresponding TLD element. The temperature data from the sensor reader is received, recorded, and displayed by a data logger that is operatively connected to the sensor reader. The data logger may also contain a computer program, which can produce a time temperature profile of each TLD based on the recorded temperature data received from the sensor reader. An example of a data logger may be a computer, or a digital thermometer. The sensor reader and data logger may be separate devices or of an integrated device. A single sensor reader/data logger may be used to record and convert signals from each thermal sensor or signals from several sensors.

In one embodiment, the noninvasive temperature verification subsystem of the present invention comprises a removable |holder|[YNCN3], which is adapted to be inserted into thermoluminescence (TL) measuring subsystem. Once inserted the removable holder is in close proximity of the TLD element. At least one temperature sensor is housed on the holder. Each temperature sensor is housed on the holder in such a way that once the holder is fully placed inside a thermoluminescence (TL) measuring subsystem, the temperature sensor is near a TLD element. A sensor reader is operatively connected to the temperature sensor, and receives real-time signal data from the sensors, and converts them to real-time temperature data. A data logger is operatively connected to the sensor reader, which can receive, record, and display the real-time temperature data from the sensor reader. The data logger may also comprise a computer program or similar analyzing device that converts the temperature data of the chamber environment near each element, and to create a temperature profile as a function of time for each TLD element. An example of the data logger is commercial multichannel data logger or single temperature meter. The thermal sensor reader and data logger may be separate devices or may be components of an integrated device.

The holder may be made of any heat resistant material that is capable of withstanding temperature generated during heating cycle, such as transparent Teflon (PTFE). The temperature generated during a heating cycle is typically equal or greater than 400° C. In the prototype designed for Thermo Fisher Scientific Harshaw Model 8800, once holder is inserted, the thermal sensor is located approximately 2-4 mm from the corresponding TLD element. The real-time temperature data from the noninvasive temperature verification subsystem of present invention may be used to control heating rate of the heater so that a desirable heating of the TLD element is obtained. The temperature profile of each TLD element supports accurate calibration of the heating rate for each TLD element. The thermal sensor may be a thermocouple, resistance thermometer or a thermistor with temperature measurement range of approximately 0-700° C.

During calibration or before each TLD reading operation, the inventive temperature verification subsystem may be used to verify the time temperature profile of a thermoluminescence (TL)-based dosimetry. The method of verification comprises the following steps:

a) heating the thermoluminescence -based dosimetry system at a controlled heating rate;
b) obtaining temperature data of each of TLD element of the thermoluminescence -based dosimetry system during heating using signal data collected from the thermal sensor placed near each of the TLD element;
c) creating a time temperature profile of each TLD element using temperature data of each TLD element; and
d) comparing measured time temperature profile to an expected time temperature profile.

The expected time temperature profile is constructed from data from the heater or heater control board. Calibration may be made based on the difference between the expected time temperature profile and the time temperature profile produced by the inventive temperature verification subsystem.

Example: Prototype Device Testing

The prototype temperature verification subsystem is built for a Thermo Fisher Scientific Harshaw Model 8800 TLD system. The heating system for this model is described in U.S. Pat. No. 4,835,388. However, the description and drawings presented herein are for illustrative purposes only and should not be construed to limit the invention in any regard. The inventive temperature verification subsystem may be adapted to be used with TLD card readers with any heating systems.

Figure 2A:
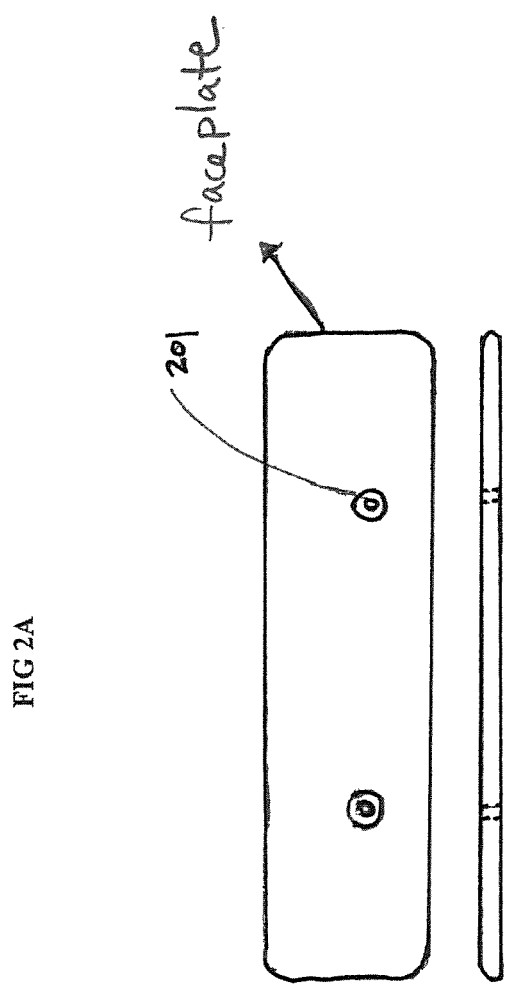
FIG. 2A shows a schematic drawing of the holder face plate of the drawer unit.
Figure 2B:
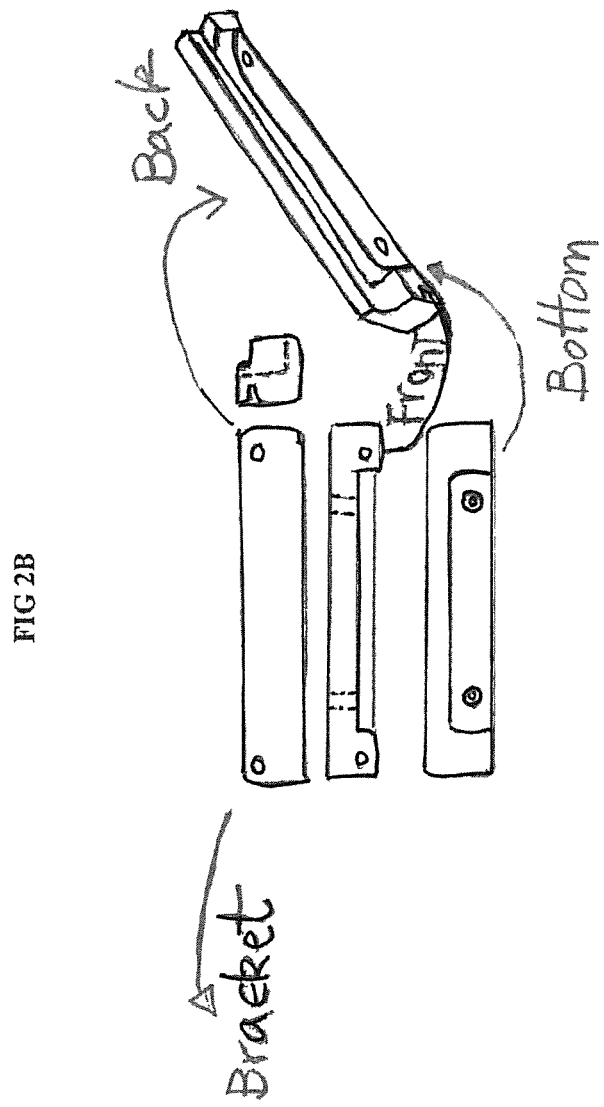
FIG. 2B shows a schematic drawing of the bracket of the drawer unit

The prototype noninvasive temperature verification subsystem include four temperature sensors 301 (see FIG. 3) housed on a removable holder assembly 100 (see FIG. 2 A-C), which is adapted to be inserted into a TLD system during temperature calibration or verification, replacing the optical filter drawer. The thermal sensor 301 is housed on the holder assembly 100 in such a way that once inserted into the TLD |system|[YNCN4], the holder assembly 100 holds each thermal sensor near one of the TLD elements.

FIG. 1 shows a schematic drawing of an embodiment of a holder assembly 100, which comprises a cover 101, and a drawer unit 105. The cover 101 is dimensioned to be resided above the recess 107 of drawer unit 105 and is fastened to the drawer unit 105 to prevent the movements of the thermal sensors 301 which is housed in recess 107 of the drawer unit 105. The drawer unit 105 further comprises a bracket 103 (FIG. 2A), which is attached to a faceplate 104 (FIG. 2B) on one side, and to an elongated drawer 102 (FIG. 2C) on the other side as shown in FIG. 1. The faceplate 104 is dimensioned to fit the opening on the TLD system designed for optical filter drawer, where the holder assembly 100 is to be inserted. The bracket 103 together with the faceplate 104 holds the holder assembly 100 stable in place during the verification process, and enable the thermal sensors that are housed in the drawer unit 105 to be placed close (2-4 mm) to their corresponding TLD elements to ensure accurate temperature measurement of the chamber environment near (or immediately adjacent) to the TLD element. This holder assembly is replaced with optical filter drawer during normal operation. In the prototype, commercial thermocouples are used as the thermal sensors (OMEGA®, Part No. OSK7356REVB or equivalent).

Figure 2C:
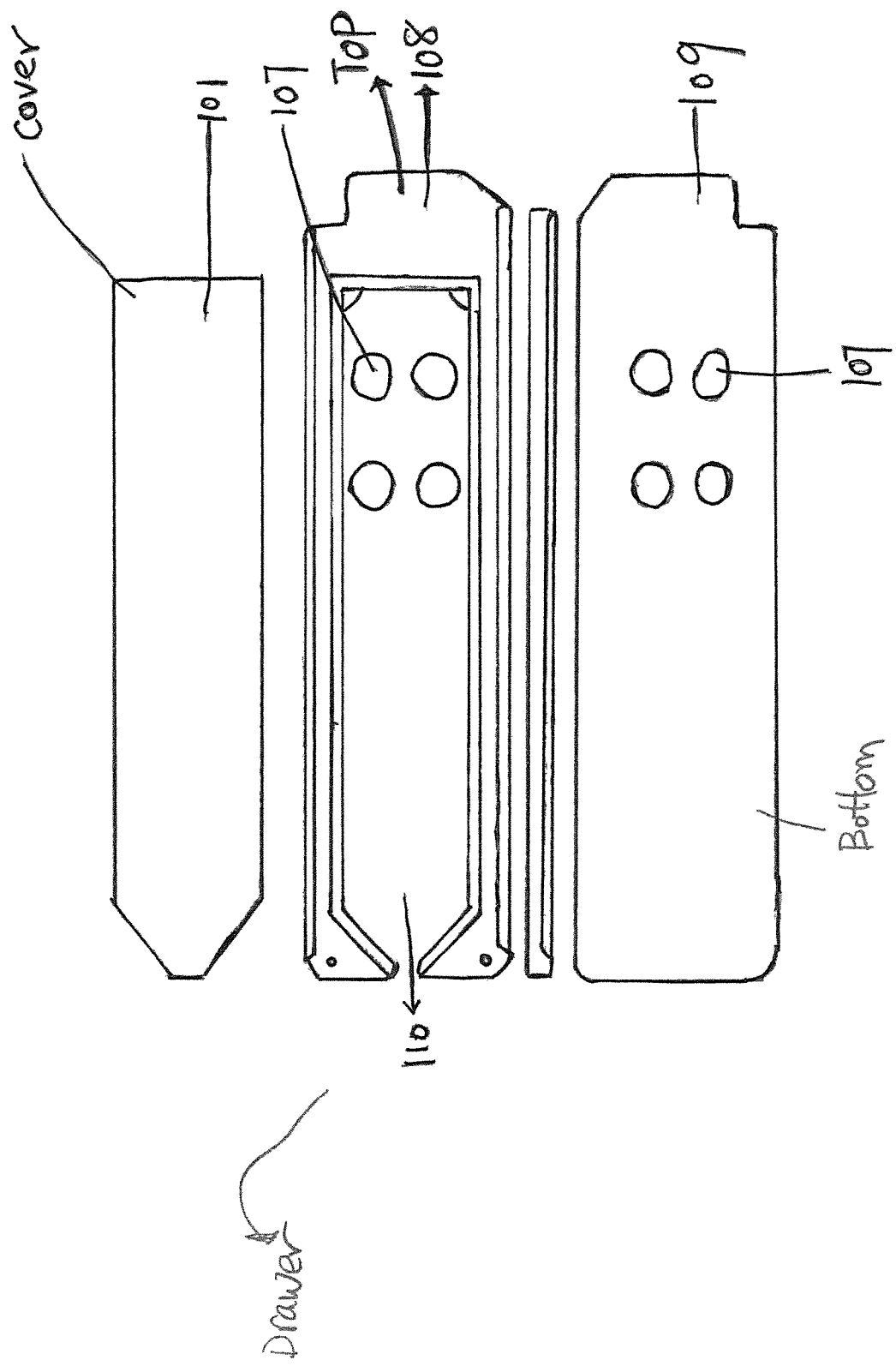
FIG. 2C shows a schematic drawing of drawer of the drawer unit.

FIG. 2C shows a schematic drawing the drawer unit 105 with its cover 101. The drawer 102 is made of a bottom 109 with circular cutouts 107, which functions as inlays to hold the thermal sensors close their respective TLD element once the holder assembly is inserted; and a top 108 that is attached to the bottom 109 on its upper surface, together the top 108 and bottom 109 of the drawer 102 creates a recess 110 that houses thermal sensors 301. The cover 101 also has cutouts 106 that allows access for the wiring to the thermal sensors 301 and can be made of semi rigid materials, such as Black Phenolic Grade CE or LE plastic. The holder assembly 100 can also be made of similar materials, such as Black Phenolic Grade CE or LE plastic.

Figure 3:
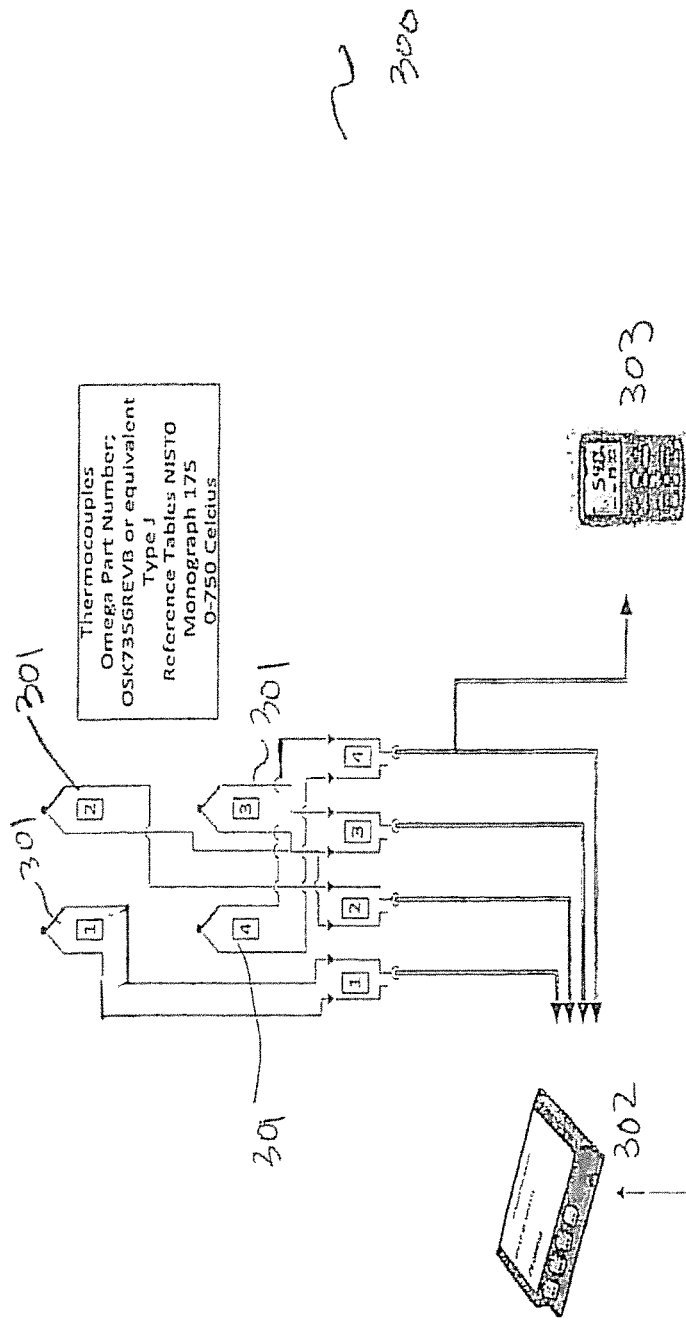
FIG. 3 shows schematically the setup of the inventive noninvasive temperature verification subsystem of the present invention.

FIG. 3 shows the schematic diagram of an embodiment of the FIG. 1 shows a schematic drawing of an embodiment of the noninvasive temperature verification subsystem of the present invention. Temperature sensors 301 capable of measuring temperature ranging approximately 0-750° C. are placed on a holder assembly 100 (not shown on FIG. 3) to be near each TLD element (not shown on FIG. 3) once the holder assembly is inserted into a TLD card reader. Each temperature sensor 301 is operatively connected to a temperature sensor reader/data logger 302, 303. Individual temperature sensor readers 303 may be used for each thermal sensor 301 converting its signal into temperature data for the TLD element that it is measuring. Alternatively, a single temperature sensor reader 302 may be used to convert signal data from all temperature sensors 301 into individual temperature data for the respective TLD element that they are measuring. The sensor reader for the prototype may also contain an integrated data logger which is operatively connected to a computer 304. The computer 304 is equipped with computer software that extracts temperature data from the temperature sensor/data logger, and use the temperature data to produces a time temperature profile for each TLD element.

Figure 4:
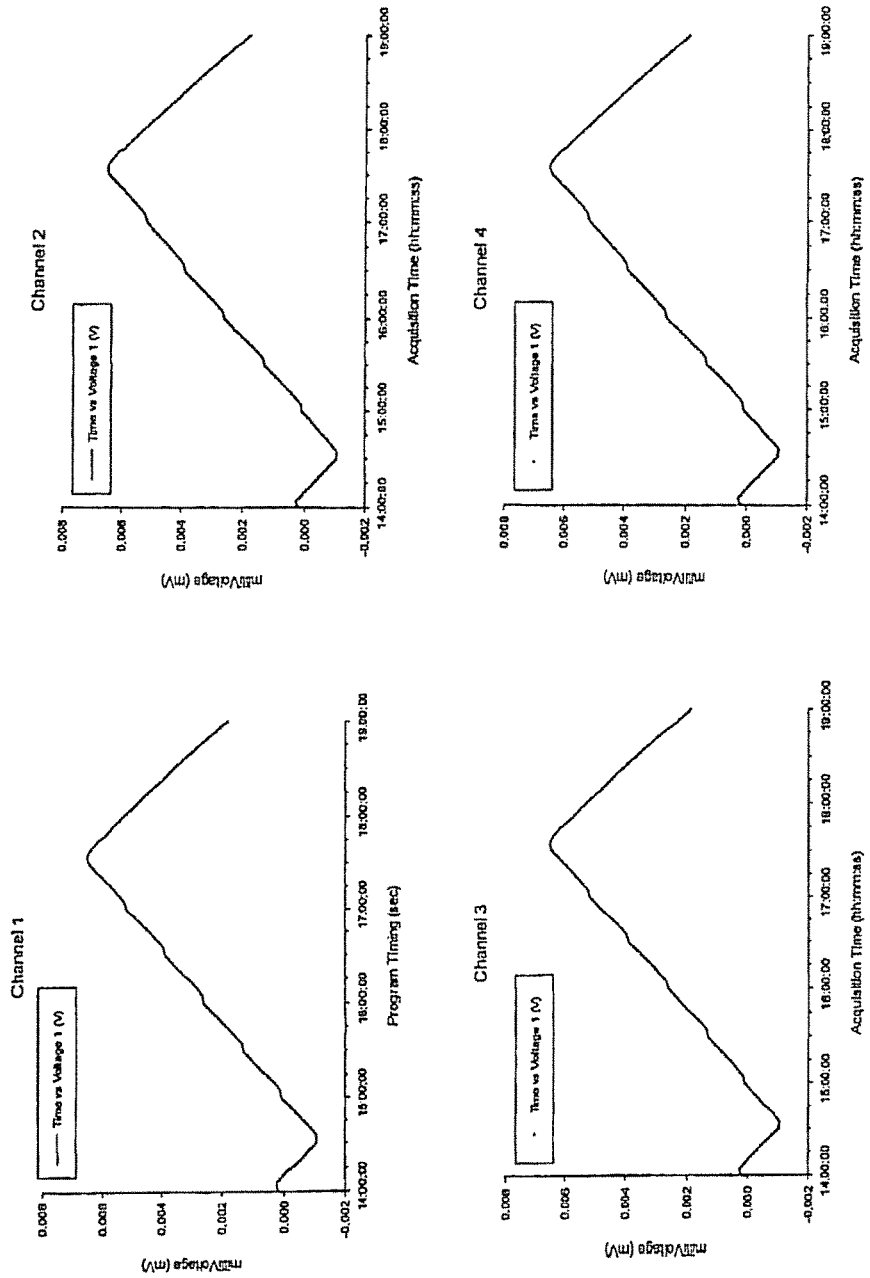
FIG. 4 shows measurements taken from each of the four thermocouples used in the prototype temperature verification subsystem during heating cycle.

FIG. 4 shows measurements taken from the thermocouples (thermal sensors) of the prototype during a heating cycle. Each of the channels corresponds to the signal data of a thermocouple placed near a TLD element. Signal data measured by each thermocouple at different time point (x-axis) during heating cycle is represented in voltage (mV) and shown on y-axis.

Figure 5:
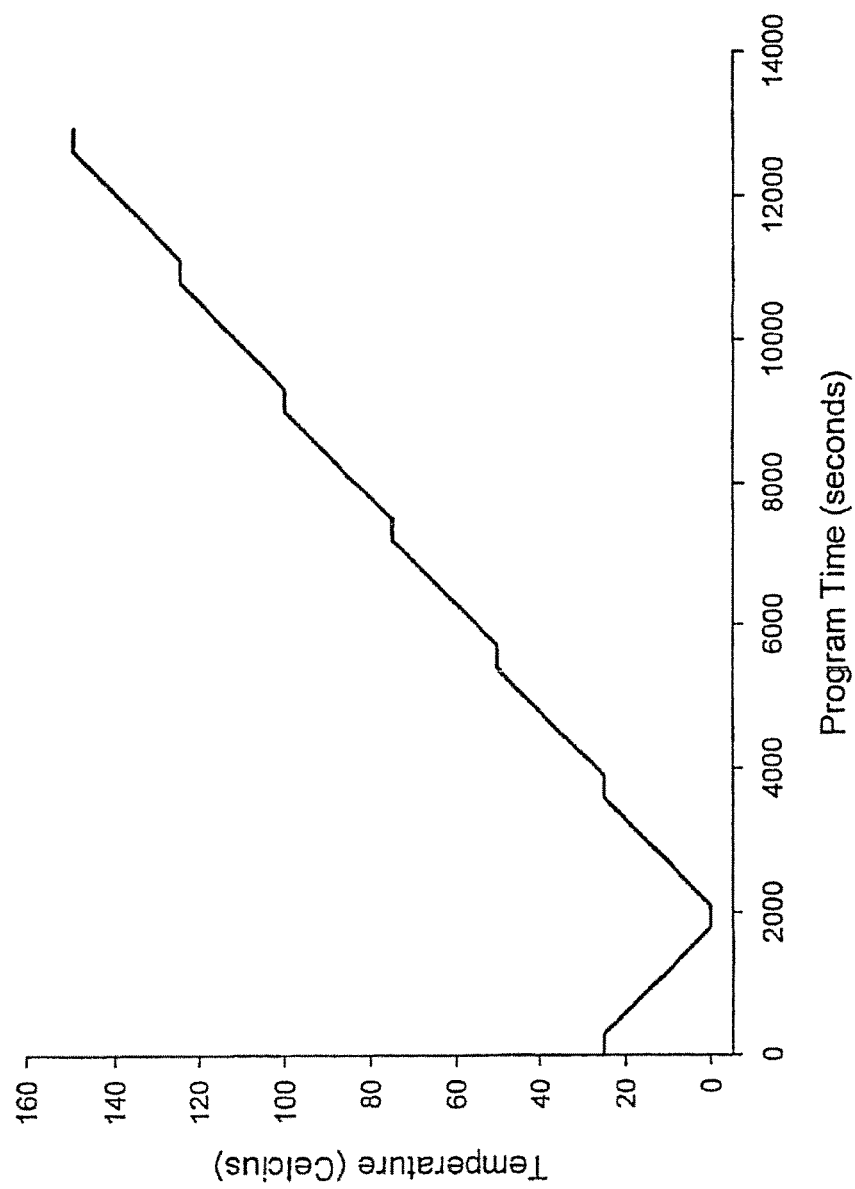
FIG. 5 shows an example of a time temperature profile produced using measurements taken by the prototype inventive temperature verification subsystem during a heating cycle.

A computer created time temperature profile based on the thermocouple measurements of FIG. 4 is shown in FIG. 5.

Figure 6:
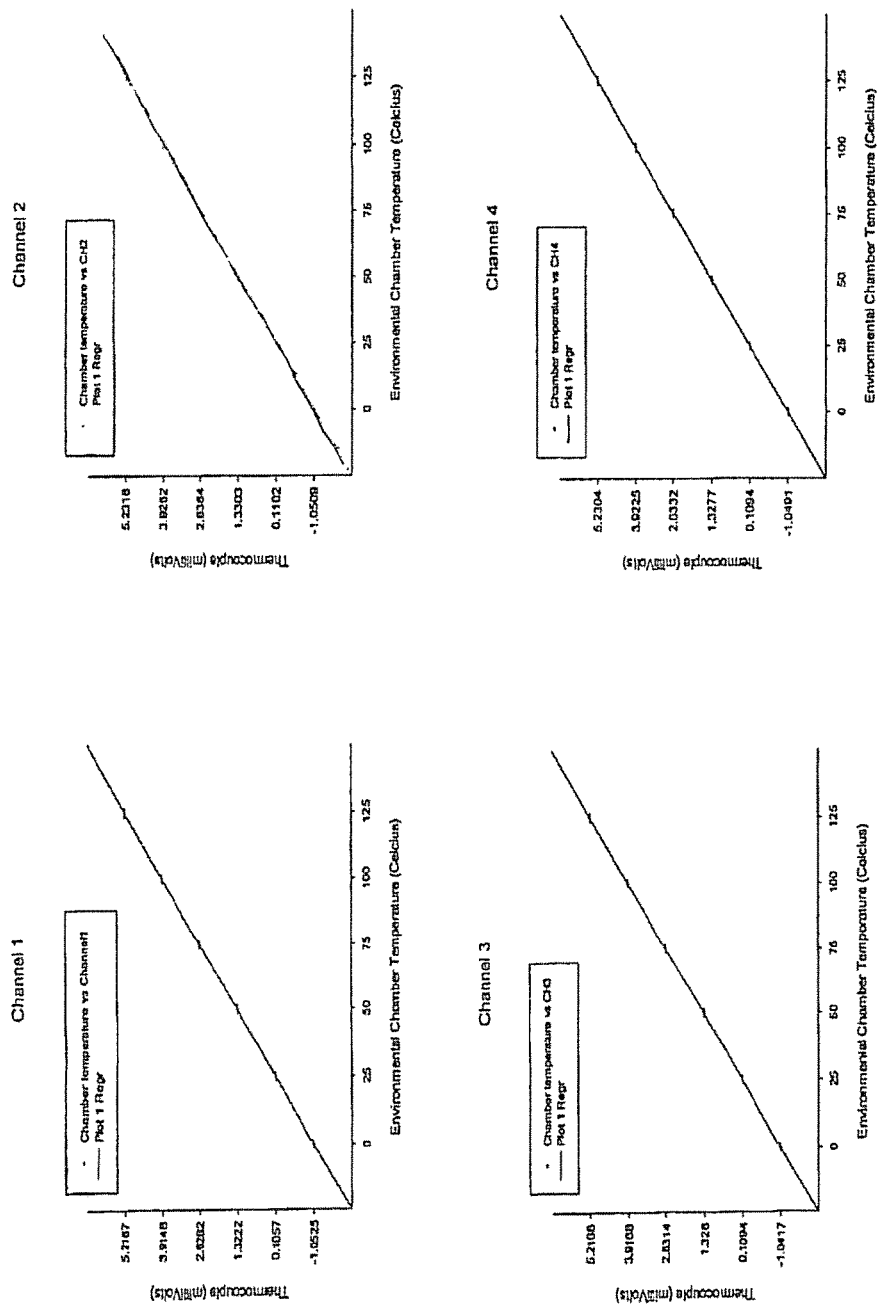
FIG. 6 shows r|egression|[$y_{NCN}2$] of environmental chamber temperatures to thermocouple voltage readings regression $F(mV)=a+bx$ (temp. ° C.)

Regressions of measurements taken from the thermocouples over time are shown in FIG. 6, which demonstrate a liner relationship between the voltage measurements from the thermocouples and corresponding temperature.

To validate the accuracy of the prototype noninvasive temperature verification subsystem, the prototype holder is inserted into a Thermo Fisher Scientific Harshaw Model 8800 TLD system. The sensor read/data logger is connected to the thermocouples and a heating cycle is run. The signal data from the thermocouples are compared to expected environment chamber temperatures (programed temperature for the TLD system during heating cycle) are evaluated based on linear regression using a statistic package (Sigmastat and Sigmaplot). Thermocouples signal data are shown to correlate to the expected temperature of the test chamber in a linear method, The coefficient of determination ($R^2$), which represents the closeness of fit of a scatter graph to its regression line, is reported at 0.9995, where $R^2=1$ which indicate an ideal fit.

REFERENCES

1) Faiz M. Khan (2003). "The Physics of Radiation Therapy". Lippincott Williams & Wilkins.
2) M. Moscovitch•, A. Szalanczy, W. W. Bruml. K. J. Velbeck and R. A. Tawil. A TLD system based on gas heating with linear time-temperature profile. Radiat Prot Dosimetry. 34(1-4):361-364. (1990).
3) Stadtmann H, Hranitzky C, Brasik N. Radiat Prot Dosimetry. Study of real time temperature profiles in routine TLD read out-influences of detector thickness and heating rate on glow curve shape. 119(1-4):310-3.

What is claimed is:

1. A thermoluminescence-based dosimetry system comprising:
   a) at least one thermoluminescent dosimetry (TLD) element operative to be heated controllably and to emit luminescence during the heating, the emitted luminescence correlated with a radiation dose to which each of said at least one TLD element has been exposed;
   b) a temperature verification subsystem for real-time monitoring of temperature data of each TLD element during the heating, comprises a removable holder and at least one temperature sensor housed on said holder, wherein said removable holder is configured to be inserted in said thermoluminescence (TL) measuring subsystem and said temperature sensor is configured to therein provide a time temperature profile of each TLD element;
   c) a heating subsystem for providing a controllable heating rate of each of said at least one TLD element;
   d) a thermoluminescence (TL) measuring subsystem for measuring the emitted luminescence, and for providing luminescence data; and
   e) a control subsystem for controlling heating parameters of the heating subsystem based on the heating rate and for providing at least one glow curve based on the luminescence data, the glow curve indicative of the radiation dose.

2. The TLD system of claim 1, wherein the noninvasive temperature verification subsystem includes at least one temperature detector.

3. The TLD system of claim 2, wherein the temperature detector further comprises:
   a) at least one thermal sensor, each thermal sensor is placed in close proximity of one of the at least one TLD element, to measure the temperature of the respective TLD element and to produce a signal data that correlates with the temperatures of the respective TLD element during heating;
   b) a sensor reader operatively connected to and receives the signal data from the at least one temperature sensor and converts said signal data to temperature data; and
   c) a data logger operatively connected to, receives and records temperature data received from the temperature sensor reader and produces a time temperature profile of the respective TLD element.

4. The TLD system of claim 3, wherein said temperature sensor is selected from the group consisting of a thermocouple, and a resistance thermometer.

5. The TLD system of claim 1, wherein the heating system includes a heater, a gas source and a conduit, wherein the conduit channels a flow of gas from the gas source, transfers heat from the heater to the gas, and discharging heated gas against said TLD element.

6. A method for verifying time temperature profile of a thermoluminescence-based dosimetry system comprising the steps of:
   a) heating the thermoluminescence-based dosimetry system at a controlled heating rate;
   b) obtaining temperature data of each of TLD elements during heating using signal data collected from a thermal sensor placed near each of the TLD element;

c) creating a time temperature profile of each TLD element using temperature readings of each TLD element; and
d) comparing the measured time temperature profile to an expected time temperature profile.

7. The method of claim 6, wherein the expected time temperature profile is produced using a temperatures from the heating controller.

8. The method of claim 6, calibrating controlled heating of said thermoluminescence -based dosimetry system according to the comparison between the measured time temperature profile and the expected time temperature profile.

* * * * *